United States Patent
Zang et al.

(10) Patent No.: US 10,922,542 B2
(45) Date of Patent: Feb. 16, 2021

(54) SYSTEM AND METHOD FOR IDENTIFYING TARGET OBJECTS

(71) Applicant: SZ DJI TECHNOLOGY CO., LTD., Shenzhen (CN)

(72) Inventors: Bo Zang, Shenzhen (CN); Cong Zhao, Shenzhen (CN); Xuyang Feng, Shenzhen (CN)

(73) Assignee: SZ DJI Technology Co., Ltd., Shenzhen (CN)

( * ) Notice: Subject to any disclaimer, the term of this patent is extended or adjusted under 35 U.S.C. 154(b) by 72 days.

(21) Appl. No.: 16/072,374

(22) PCT Filed: Mar. 1, 2016

(86) PCT No.: PCT/CN2016/075224
§ 371 (c)(1),
(2) Date: Jul. 24, 2018

(87) PCT Pub. No.: WO2017/147789
PCT Pub. Date: Sep. 8, 2017

(65) Prior Publication Data
US 2019/0034693 A1    Jan. 31, 2019

(51) Int. Cl.
*G06T 7/11* (2017.01)
*G06T 7/194* (2017.01)
*G06T 7/70* (2017.01)
*G06T 7/20* (2017.01)
*G06K 9/00* (2006.01)
*B64C 39/02* (2006.01)

(52) U.S. Cl.
CPC .......... *G06K 9/0063* (2013.01); *B64C 39/024* (2013.01); *G06T 7/11* (2017.01);
(Continued)

(58) Field of Classification Search
None
See application file for complete search history.

(56) References Cited

U.S. PATENT DOCUMENTS

2011/0169943 A1    7/2011  Bachman, II et al.
2018/0259960 A1*   9/2018  Cuban .................... H04N 7/181
2020/0184103 A1*   6/2020  Matusek ................. G06K 9/66

FOREIGN PATENT DOCUMENTS

CN    104881650       0/2015
CN    1604125 A       4/2005
(Continued)

OTHER PUBLICATIONS

International Search Report from the Chinese Patent Office for International Application No. PCT/CN2016/075224, dated Mar. 1, 2016.
(Continued)

*Primary Examiner* — Idowu O Osifade
(74) *Attorney, Agent, or Firm* — Finnegan, Henderson, Farabow, Garrett & Dunner, LLP (57) ABSTRACT

A method, system, article of manufacture, and UAV configured to identify a target object shown in an image, such as shown in a perspective view that is a two-dimensional image or frame of video. The method comprises: identifying and track the position of a target object shown in a sequence of images or video, even when the target object may be traveling at high speeds, detecting the target object within an image based on one or more of the object's physical characteristics, such as its color, shape, size, chrominance, luminance, brightness, lightness, darkness, and/or other characteristics. Thus, in this context a target object may be anything having one or more detectable physical characteristics. The method also providing an improved and more intuitive user interface that enables a user to select a target object for tracking. As a result, the method and system improve the accuracy, usability, and robustness of the system.

22 Claims, 8 Drawing Sheets

(52) U.S. Cl.
CPC .............. *G06T 7/194* (2017.01); *G06T 7/20* (2013.01); *G06T 7/70* (2017.01); *B64C 2201/123* (2013.01); *B64C 2201/127* (2013.01); *G06T 2207/10032* (2013.01); *G06T 2207/20101* (2013.01); *G06T 2207/20104* (2013.01)

(56) References Cited

FOREIGN PATENT DOCUMENTS

| CN | 1897015 | 1/2007 |
|----|---------|--------|
| CN | 101567046 | 10/2009 |

OTHER PUBLICATIONS

Extended European Search Report in counterpart European Patent Application No. 16891982.7 dated Oct. 26, 2018.

Rustam Stolkin et al., "Efficient visual servoing with the ABCshift tracking algorithm," 2008 IEEE International Conference on Robotics and Automation, Pasadena, CA, USA, May 19-23, 2008, pp. 3219-3224.

Pankaj Kumar et al., "Real Time Target Tracking with Pan Tilt Zoom Camera," 2009 Digital Image Computing: Techniques and Applications, pp. 492-497.

First Office Action in counterpart Chinese Patent Application No. 201680046266.7, dated Jul. 17, 2020.

Examination Report dated Nov. 9, 2020, in corresponding European Application No. 16 891 982.7-1210 (9 pages).

Soriano M et al, "Skin Detection in Video Under Changing Illumination Conditions," Proceedings/15$^{th}$ International Conference on Pattern Recognition, Barcelona, Spain, Sep. 3-7, 2000; [Proceedings of the International Conference on Pattern Recognition. (ICPR)], IEEE Computer Society, Los Alamitos, Calif. [U.A.], vol. 1, Sep. 3, 2000 (Sep. 3, 2000), pp. 839-842, XP10533678, DOI: 10.1109/ICPR.2000.905542 ISBN: 978-0-7695-0750-7 (4 pages).

\* cited by examiner

SYSTEM AND METHOD FOR IDENTIFYING TARGET OBJECTS

CROSS-REFERENCE TO RELATED PATENT APPLICATIONS

This application is a National Stage Entry of International Application No. PCT/CN2016/075224, filed Mar. 1, 2016. The entire contents of the above-referenced application are expressly incorporated herein by reference.

TECHNICAL FIELD

The present disclosure relates generally to visual tracking of target objects and, more particularly, to systems and methods of identifying target objects.

BACKGROUND

Unmanned aerial vehicles ("UAV"), sometimes referred to as "drones," include pilotless aircraft of various sizes and configurations that can be remotely operated by a user or programmed for automated flight. UAVs can be used for many purposes and are often used in a wide variety of personal, commercial, and tactical applications. For instance, UAVs can be equipped with imaging equipment, such as cameras, video cameras, etc., which allow users to capture images or video footage that is too difficult, not practical, or simply not possible to capture otherwise. UAVs equipped with imaging devices find particular use in the surveillance, national defense, and professional videography industries, among others, besides being popular with hobbyists and for recreational purposes.

UAVs equipped with imaging equipment may allow users to track a target object remotely. This ability to track a target object allows the UAVs to operate autonomously while tracking the movement of the object. However, tracking a target object using UAVs may present challenges. For example, there is an existing need for UAVs that can accurately track a target object travelling at high speed relative to other objects and background scenery, as well as target objects with various shapes.

SUMMARY

The disclosed embodiments include methods, systems, articles of manufacture, and UAVs configured to identify a target object shown in an image, such as shown in a perspective view that is a two-dimensional image or frame of video. The techniques described in the disclosed embodiments may be used to identify and track the position of a target object shown in a sequence of images or video, even when the target object may be travelling at high speeds. The disclosed embodiments detect the target object within an image based on one or more of the object's physical characteristics, such as its color, shape, size, chrominance, luminance, brightness, lightness, darkness, and/or other characteristics. Thus, in this context a target object may be anything having one or more detectable physical characteristics. The disclosed embodiments also provide an improved and more intuitive user interface that enables a user to select a target object for tracking. As a result, the disclosed embodiments improve the accuracy, usability, and robustness of the system.

In the disclosed embodiments, a system may receive a user input indicating the position of a target object within an image, for example, based on a user-selected point, pixel, region, area, or coordinates in the image. The system may define a first area and a second area in the image based on the user-selected position. The system may compare image characteristics in the first and second areas to identify the target object within the image. The image may be a two-dimensional perspective view of image or video data captured by a movable device, such as a UAV.

In one aspect, the disclosed embodiments may define the first area as a foreground area and the second area as a background area surrounding the foreground area. In one aspect, the disclosed embodiments may determine a representation of a first physical meaning of objects and features shown in the image based on image characteristics in the first area and a representation of a second physical meaning based on the image characteristics in the second area. The disclosed embodiments may compare the representations of the first and second physical meanings to identify the target object in the image.

In another aspect, the disclosed embodiments may generate a first histogram representing the image characteristics in the first area and a second histogram representing the image characteristics in the second area, determine a third histogram by combining the first and second histograms using a predetermined function, and apply the third histogram to an area of interest, the area of interest comprising the first and second areas. In one aspect, the predetermined function may determine, for each image characteristic, a ratio of a value for that image characteristic in the first area divided by a value for that image characteristic in both the first and second areas.

In a further aspect, the disclosed embodiments may redefine the first and second areas based on the probabilities of whether points, pixels, regions, or areas in the first and second areas contain the target object. In a further aspect, the disclosed embodiments may generate a new first histogram representing the image characteristics in the redefined first area and a new second histogram representing the image characteristics in the redefined second area, determine a new third histogram by combining the new first and second histograms using a second predetermined function. In one aspect, the disclosed embodiments may use the same predetermined function to determine the third histogram and the new third histogram. In a further aspect, the disclosed embodiments may apply the new third histogram to the area of interest to create a back-projected image.

In a further aspect, the disclosed embodiments may repeat each of the steps of redefining the first and second areas, generating a new first histogram and new second histogram, determining a new third histogram, and applying the new third histogram to the area of interest. In one aspect, the disclosed embodiments may identify likely contours of the target object. In one aspect, the disclosed embodiments may use the identified target object to track a position of the target object.

The techniques described in the disclosed embodiments may be performed by any apparatus, system, or article of manufacture, including a movable object such as a UAV, or a controller, or any other system configured to receive image data (including video data) and track target objects shown in the received images. Unlike prior tracking systems, the techniques described herein can more accurately track target objects that may be moving at high speeds relative to the image-capture device.

It is to be understood that both the foregoing general description and the following detailed description are exemplary and explanatory only and are not restrictive of the disclosed embodiments as defined in the claims.

BRIEF DESCRIPTION OF DRAWINGS

The accompanying drawings, which are incorporated in and constitute a part of this specification, illustrate several embodiments and, together with the description, serve to explain the disclosed principles. In the drawings.

DETAILED DESCRIPTION

Tracking a target object using UAVs may present challenges. For example, first, the target object may be travelling at a high speed, so the UAV must be able to identify the target object quickly without losing accuracy in its tracking; second, when a user identifies a target object for the UAV to track, the user often cannot accurately select the target object if its contour is not in a regular shape (such as a square, rectangular, etc.), which actually accounts for most cases in practical use. The known technologies simply instruct the UAVs to track whatever closed area the user selects, without approximating to the contours of the target object in the image. As a result, objects other than the target object are being tracked by the UAV, including features in background scenery or the surrounding area. This renders the tracking less responsive and prone to losing sight of the target object.

The disclosed embodiments provide improved techniques for visual tracking of target objects and, more particularly, systems and methods of identifying target objects in perspective views based on a user selection. The resulting systems and methods provide enhanced accuracy, usability, and robustness in their ability to identify a target object, which may be moving at a high speed, in a perspective view.

Reference will now be made in detail to exemplary disclosed embodiments, examples of which are illustrated in the accompanying drawings and disclosed herein. Where convenient, the same reference numbers will be used throughout the drawings to refer to the same or like parts.

Figure 1:
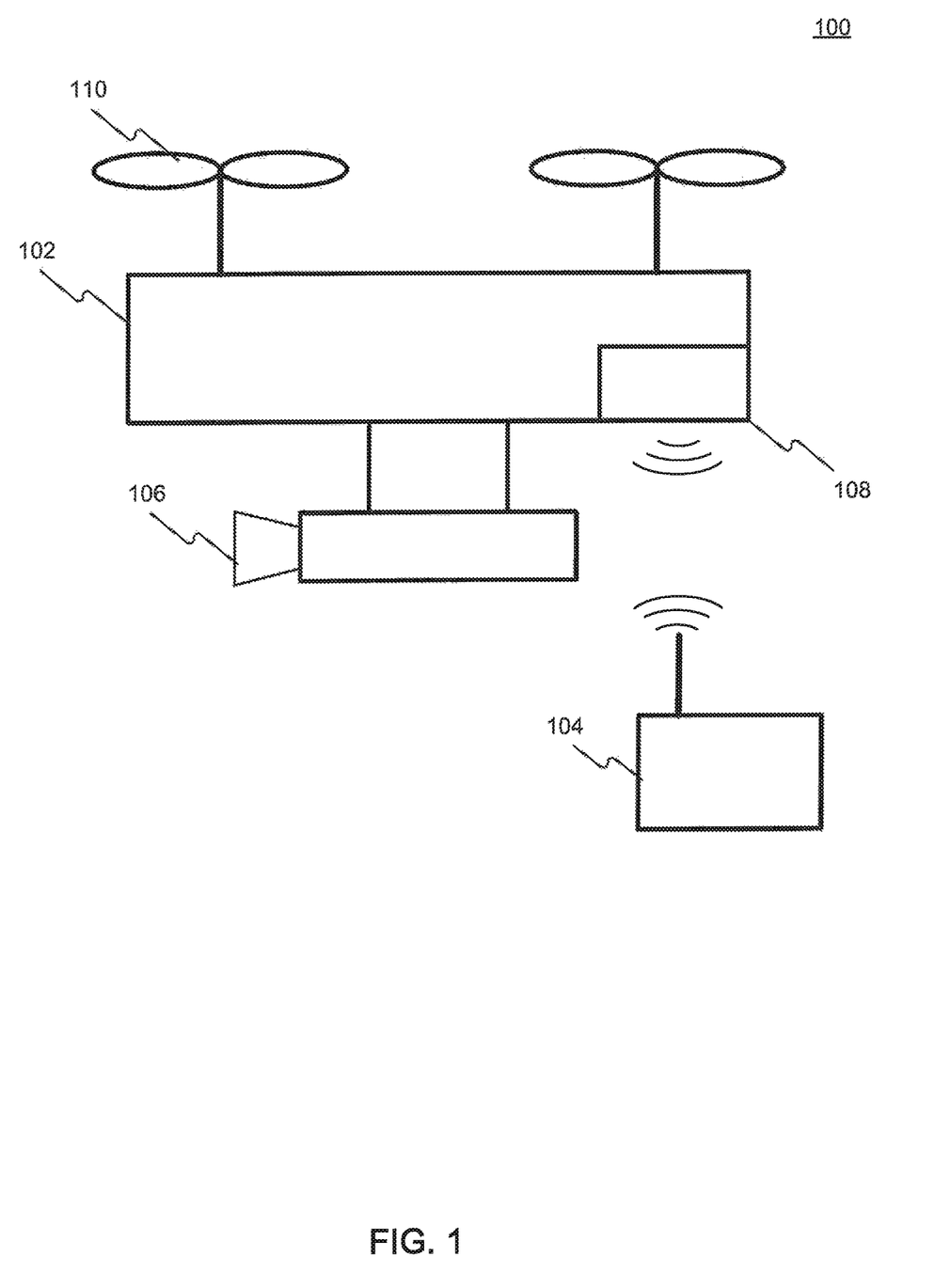
FIG. 1 is a schematic diagram of an exemplary system that may be used to identify a target object in accordance with the disclosed embodiments.

FIG. 1 is a diagram of an exemplary system 100 for performing one or more operations in accordance with the disclosed embodiments. The system 100 may include one or more movable objects 102 of various sizes and configurations. According to some embodiments, the movable object 102 may be any suitable object, device, mechanism, system, or machine configured to travel on or within a suitable medium (e.g., a surface, air, water, rails, space, underground, etc.). The movable object 102 may be an unmanned aerial vehicle (UAV), for example, that is movable using one or more propellers 110. Although the movable object 102 is shown and described herein as a UAV for exemplary purposes of this description, it will be understood that other types of movable objects (e.g., wheeled objects, nautical objects, locomotive objects, other aerial objects, or the like) may also or alternatively be used in embodiments consistent with this disclosure. As used herein, the term UAV may refer to an aerial device configured to be operated and controlled autonomously (i.e., via an electronic control system) and/or manually by off-board personnel.

The movable object 102 may be configured with imaging equipment 106, such as cameras, video cameras, or the like, to capture and track a target object. In some embodiments, the movable object 102 may include one or more processors, one or more input/output (I/O) devices, and one or more Memories. The movable object 102 may also be configured to communicate with one or more other components in the system 100 including, for example, a user controller 104 or other movable objects (not shown).

As shown in FIG. 1, the movable object 102 may communicate with the user controller 104, for example, over a wireless link. The movable object 102 may include an interface 108 for communicating with the user controller 104 via any appropriate wireless protocols. The user controller 104 may include, but is not limited to, a general-purpose computer, computer cluster, terminal, mainframe, mobile computing device, or other computer device capable of receiving user input. In this context, a mobile computing device may include, but is not limited to, a mobile phone, smartphone, personal digital assistant, tablet, laptop, etc.

The user controller 104 may be configured to communicate with one or more components of the system 100 including, for example, the movable object 102, other UAVs (not shown), and other user controllers (not shown). In some embodiments, the user controller 104 may execute software configured to communicate with the movable object 102, display one or more images obtained from the imaging equipment 106 on the movable object 102, and receive user inputs (e.g., to select target objects in displayed images or video) through an input device, such as a keyboard, touch-screen, mouse, stylus, or any other device or combination of devices through which the user can provide input data. In some embodiments, the disclosed operations for identifying a target object are performed by software in the movable object 102, but alternatively, these operations may be performed by software in the user controller 104, or may be performed by the coordinated operation of software executing in the movable object 102 and software executing in the user controller 104.

Figure 2:
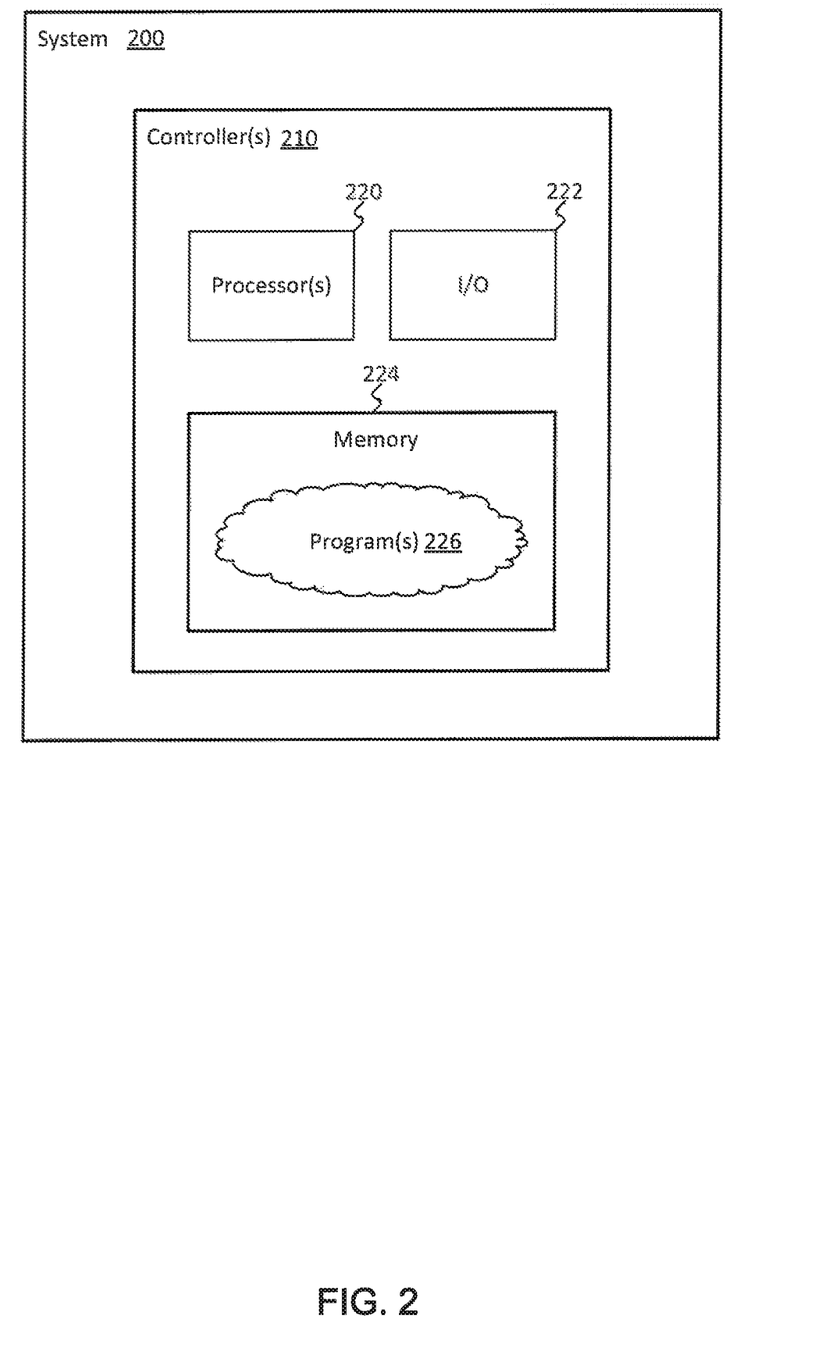
FIG. 2 is a schematic diagram of another exemplary system that may he used to identify a target object in accordance with the disclosed embodiments.

FIG. 2 is a schematic block diagram of an exemplary system 200 that may be used in accordance with the disclosed embodiments. The system 200, or variations thereof, may be used to implement components in the system 100, including for example the movable object 102 and/or user controller 104. The system 200 may include one or more processors 220, one or more I/O devices 222, and one or more memories 224, which in some embodiments may be implemented within one or more controllers 210. In some embodiments, the system 200 may take the form of a mobile computing device, general-purpose computer, a mainframe computer, or any combination of these components. Alternatively, the system 200 may be implemented in a UAV 102 or a user controller 104 for performing one or more operations consistent with the disclosed embodiments. For example, the system 200 may be a stand-alone system, or it may be implemented as a subsystem in a larger system, where one or more operations in the system 200 are performed using parts of the larger system.

Processor 220 may include one or more known processing devices. For example, the processor may be from the family of processors manufactured by Intel, from the family of processors manufactured by Advanced Micro Devices, or the like. Alternatively, the processor may be based on the ARM architecture. In some embodiments, the processor may be a mobile processor. The disclosed embodiments are not limited to any type of processor configured in controller 210.

I/O devices 222 may be one or more devices configured to allow data to be received and/or transmitted by the controller 210. The I/O devices 222 may include one or more communication devices and interfaces, and any necessary analog-to-digital and digital-to-analog converters, to communicate with other machines and devices, such as other components in the system 100, including the movable object 102 and/or user controller 104.

Memory 224 may include one or more storage devices configured to store software instructions used by the processor 220 to perform functions related to the disclosed embodiments. For example, the memory 224 may be configured to store software instructions, such as program(s) 226, that perform one or more operations when executed by the processor(s) 220 to identify a target object in an image. The disclosed embodiments are not limited to software programs or devices configured to perform dedicated tasks. For example, the memory 224 may include a single program 226, such as a user-level application, that performs the functions of the disclosed embodiments, or may comprise multiple software programs. Additionally, the processor 220 may execute one or more programs (or portions thereof) remotely located from the controller 210. For example, the movable object 102 may access one or more remote software applications via the user controller 104, such that, when executed, the remote applications perform at least some of the functions related to the disclosed embodiments for identifying a target object. Furthermore, the memory 224 also may be configured to store data, for example, for use by the software program(s) 226.

It is to be understood that the configurations acid boundaries of the functional building blocks shown for exemplary systems 100 and 200 have been arbitrarily defined herein for the convenience of the description. Alternative implementations may be defined so long as the specified functions and relationships thereof are appropriately performed and fall within the scope and spirit of the invention.

Figure 3:
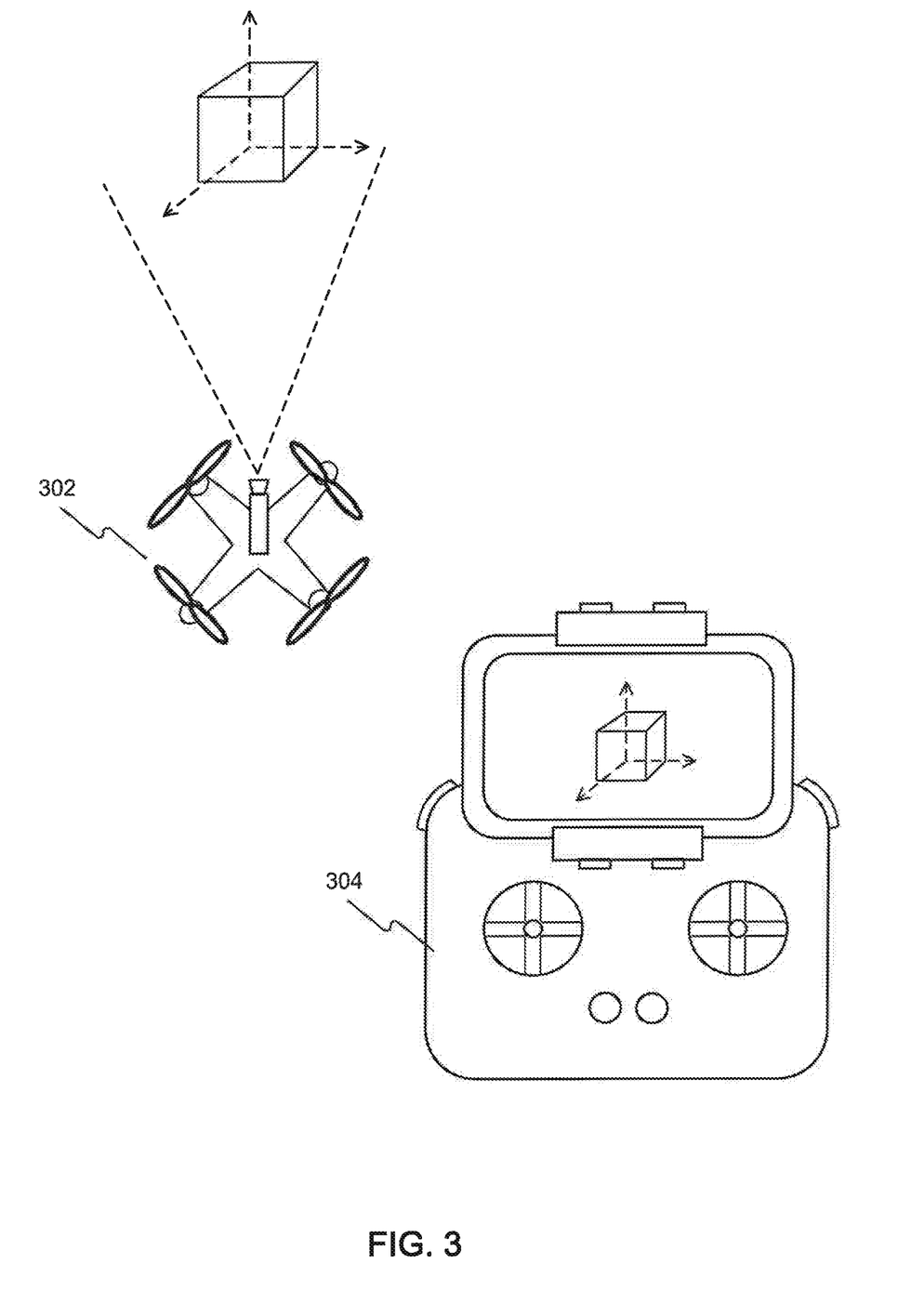
FIG. 3 is a schematic diagram of yet another exemplary system that may be used to identify a target object in accordance with the disclosed embodiments.

FIG. 3 is a diagram of another exemplary system 300 for identifying a target object in accordance with disclosed embodiments. As shown in FIG. 3, a user controller 304 may include a display device for displaying information to a user and may also include one or more input devices through which the user can input data and/or control operation of a remote UAV 302. The user controller 304 may be configured to receive signals from the UAV 302, where the received signals may be indicative of information or data relating to movements of the UAV 302 and/or data (e.g., imaging data) captured using imaging equipment on the UAV 302. In some embodiments, the user controller's display device may be a multifunctional display device, such as a touch screen, that is configured to display information d also receive user inputs. For example, in one embodiment, the display device may be configured to receive user inputs via a multifunctional screen. In another embodiment, the multifunctional screen may be the only input device for receiving user input.

In some disclosed embodiments, the display device may be an integral component of the user controller 304. That is, the display device may be built-in, attached, or fixed to the user controller 304. In other embodiments, the display device may be connectable to (and dis-connectable from) the user controller 304. For example, the user controller 304 may be configured to be electronically connectable to a display device (e.g., via a connection port or a wireless communication link), or the display device may be connectable to the user controller 304 via a mounting device, such as by a clamping, clipping, clasping, hooking, adhering, or other type of mounting device.

As shown in FIG. 3, a user may see a stream of image or video data that was captured by the UAV 302, transmitted to the user controller 304, and presented to the user as a two-dimensional perspective view on the display device. In some embodiments, the stream of images or video is displayed on a built-in display device in the user controller 304, or alternatively the stream may be displayed on an external display device connected to, or in communication with, the user controller 304; such as on a display of a smartphone, tablet, laptop, monitor, television, or any other display device that may be coupled to the user controller 304. In other embodiments, the image or video stream may be accessed through an application executing on a smartphone, tablet, or the like.

Figure 4:
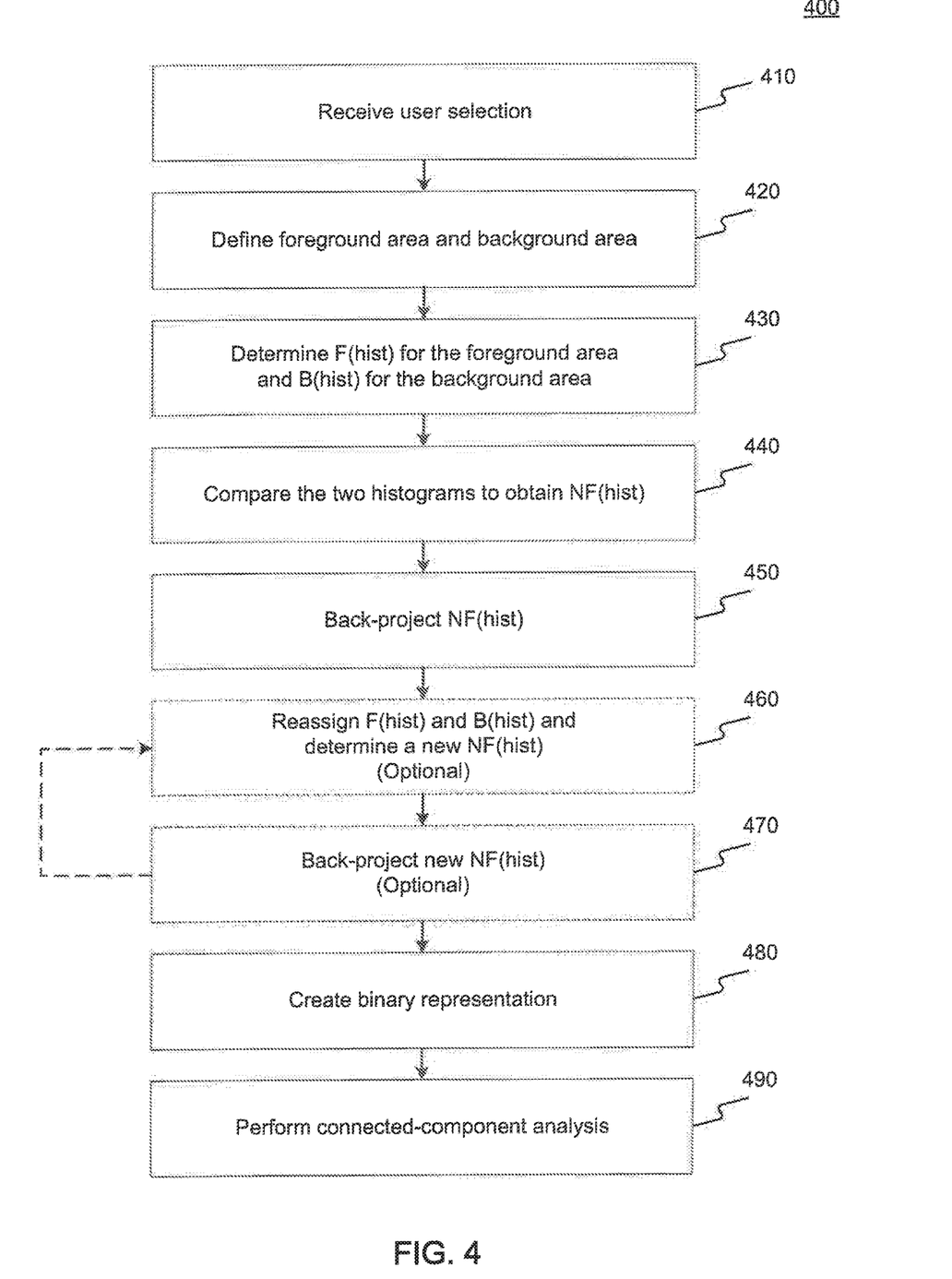
FIG. 4 is a flowchart illustrating an exemplary sequence of steps that may be performed for identifying a target object in accordance with the disclosed, embodiments.

FIG. 4 shows a flowchart illustrating a sequence of steps that performs an exemplary process 400 for identifying a target object in accordance with the disclosed embodiments. The process of FIG. 4 may be implemented in software, hardware, or any combination thereof. For purposes of explanation and not limitation, the process 400 will be described in the context of system 100, such that the disclosed process may be performed by software executing in the user controller 104 and/or movable object 102.

In the system 100, the user controller 104 may receive a live or time-delayed stream of image or video data from the movable object 102. The user controller 104 may display the received image or video data in a perspective view on a display device, for example, built into the user controller. The perspective view may correspond to any image obtained from a camera or video equipment, for example, on the movable object 102. According to some embodiments, the user operating the user controller 104 may see a target object that the user desires to track in at least one of the displayed perspective views of image or video data. The target object, for example, may include stationary objects such as parked cars, buildings, geographic features, etc. Alternatively, the target object may be slow-moving objects such as a person on a hike, or a fast-moving object such as a moving vehicle.

Having identified a target object in a displayed perspective view of image or video data, the user may select the target object in the view using an appropriate input device, for example, connected to or integrated in the user controller 104. At step 410, the system may receive the user input, including the user selection information. The user section information may be presented in various styles or forms. In an exemplary embodiment, the user may select a point on the target object (e.g., point 5a on a target object in FIG. 5) using, for example, a touchscreen or mouse configured to select a point in the displayed data. In another embodiment, the user may drag and select an area containing the target object (e.g., area 6b including a target object in FIG. 6) formed, for example, by dragging a cursor along path 6a or by the user drawing a rectangular perimeter 6b around the target object. For example, when the target object is a fast-moving vehicle, the user may select the vehicle as a target object by simply clicking on a point on the displayed vehicle using a mouse or similar input device rather than selecting the entire vehicle. However, when the target object is stationary or moving slowly, the user alternatively may select the entire target object by selecting an area around the object.

Figure 5:
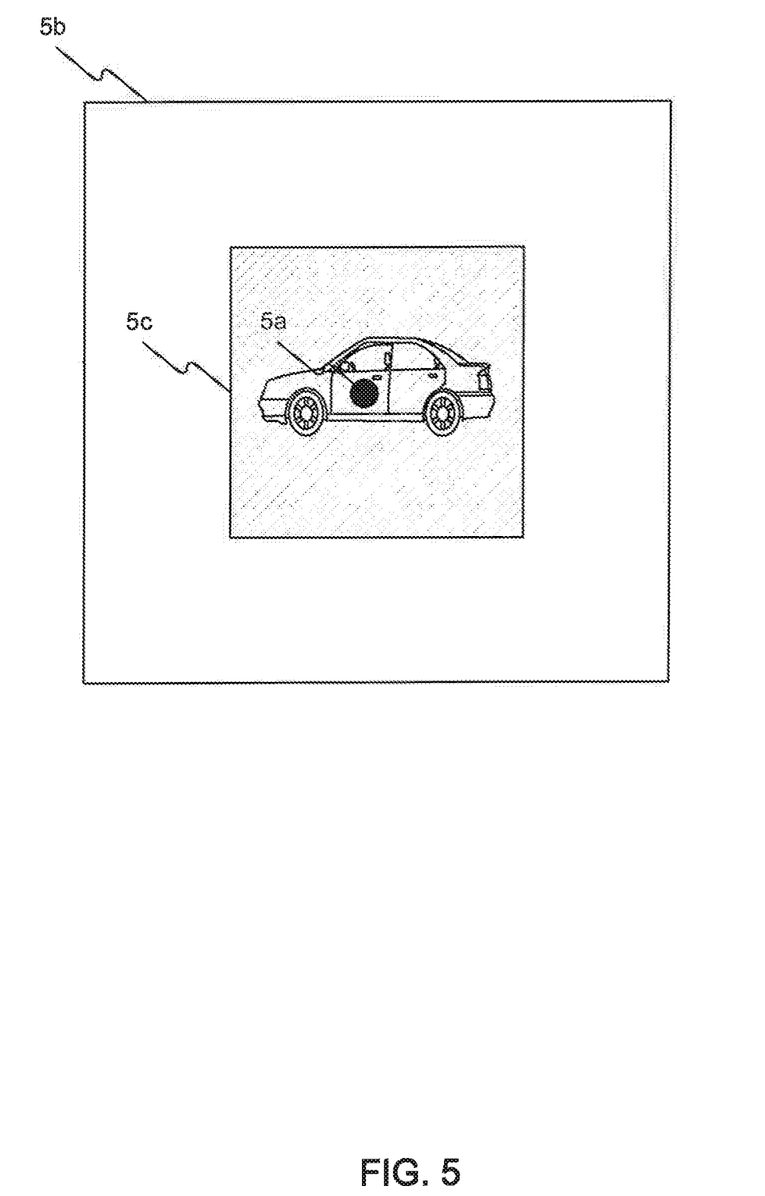
FIG. 5 is a schematic diagram of an exemplary perspective view having first and second areas in accordance with the disclosed embodiments.

After receiving the user input at step 410, at step 420 the system may perform an process initialization in which it may define an area of interest (e.g., the area within perimeter 5b in FIG. 5) based on the user-selected point (e.g., point 5a in FIG. 5). In defining the area of interest, the system 100 may consider various factors such as the total resolution of the video feed, the system's maximum target size requirement, the minimum details needed for accurate identification, etc.

At step 420, the system 100 may determine a foreground area based on the area of interest (e.g., foreground area is the area within perimeter 5c in FIG. 5). In defining the foreground area, the system may consider various factors such as the total resolution of the video feed, the system's maximum target size requirement, the minimum details needed for accurate identification, etc. The size and shape of the foreground area may be arbitrarily defined, and the system 100 may define the foreground area using various sizes or shapes in the displayed perspective view, and in some embodiments the foreground area may comprise a collection of different areas that collectively form the foreground area. In some exemplary embodiments, the width and height of the foreground area may be chosen to be 50% of the width and height of the area of interest. In other embodiments, the foreground area has the user-selected point at its center. During this initialization process, the system 100 also may define a background area relative to the foreground area and the area of interest (e.g., the background area in FIG. 5 is the area between the bounding perimeters 5b and 5c).

In other embodiments, the system 100 may define the area of interest based on a user-selected area, for example, selected by a user who drags a cursor o select an area that encompasses the desired target object in the perspective view. For example, the system 100 may set the user-selected area as the outer boundary of the area of interest (e.g., perimeter 6b in FIG. 6). System 100 may define the foreground area within the area of interest (e.g., the area within the perimeter 6c in FIG. 6) and a corresponding background area (e.g., the area between the perimeters 6b and 6c).

Figure 6:
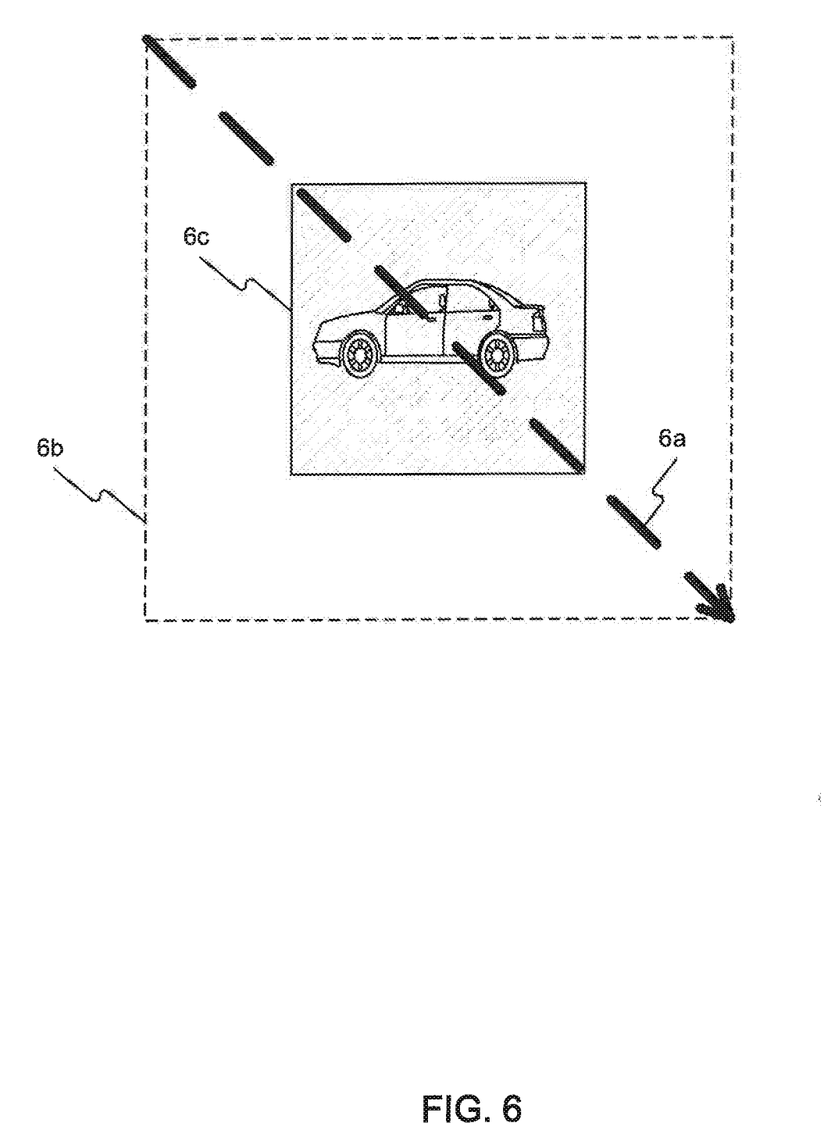
FIG. 6 is a schematic diagram of another exemplary perspective view having first and second areas in accordance with the disclosed embodiments.

When the area of interest is defined based on a user-selected area, it is possible to assume that the probability of the target object being near the center of the area of interest is greater than the probability of the target object being in the background area, which would be closer to the outer boundary of the area of interest. In some embodiments, the system 100 may define the foreground area as an area covering the center of the area of interest and also define the background area as an area near the outer boundary of the area of interest. Additional details related to exemplary step 420 are illustrated in FIGS. 5 and 6.

Next, at step 430, the system 100 may determine histograms F(hist) and B(hist) corresponding to the displayed image or video data within each of the foreground and background areas that were defined at step 420. In essence, and as explained further below, the system 100 attempts to map the physical meanings of the image characteristics found in the foreground and background areas in respective histogram representations. These histograms represent the distributions of pixels having certain image characteristics contained in the foreground and background areas and their respective physical meanings.

In some embodiments, the system 100 may determine the most suitable histogram format based on the existing lighting condition and/or available color range. For example, in a low-lighting condition where the color range is limited, an intensity histogram may be adequate to characterize the image's pixel values in each of the foreground and background areas. Alternatively, an RGB color space, for example, may be used to characterize the image characteristics and generate histograms for the foreground and background areas. In other embodiments, the system 100 may determine the histograms based on other color spaces and/or image characteristics. For example, the histogram may represent the distribution of an area's hue, saturation, and value in an HSV space. Accordingly, other image characteristics in the foreground and background areas also may be described by a histogram, including but not limited to, the chrominance, luminance, brightness, lightness, darkness, etc.

In an exemplary embodiment, the system 100 may separately create a histogram for each of the foreground and background areas. Alternatively, the system 100 may simultaneously create the histograms for the foreground and background areas. For purposes of this disclosure, the histogram of the foreground area may be represented by a function F(hist), and the histogram of the background area by a function B(hist). In some embodiments, the system 100 may create separate histograms of red, green, and blue channels (in a RGB color space) for each of the foreground and background histograms, or alternatively the system 100 may generate a three-dimensional (3D) RGB histogram with its three axes representing the red, green, and blue channels, for each of the foreground and background areas. For example, F(hist) may be a 3D RGB histogram of the foreground area, where each pixel value in the foreground area is represented by a red, green, and blue (RGB) coordinate in the 3D space. In such an embodiment, the histogram F(hist) would reflect the number of pixels in the foreground area for each possible RGB coordinate. Similarly, the histogram B(hist) may be a 3D RGB histogram for the pixel values in the background area, where each pixel value of the background area is represented by RGB coordinate. In some embodiments, the system 100 may normalize the F(hist) and Whist) histograms, depending on the sizes of the foreground and background areas, so histogram F(hist) and histogram B(hist) may be of similar sizes and/or shapes.

As an example, the foreground area may primarily contain the target object (e.g., the car inside the foreground area bounded by perimeter 5b in FIG. 5). If the target object s a red sports car, for example, then the 3D RGB histogram F(hist) will reflect that with a relatively high count of red pixels. That is, the majority of pixels in the foreground area will be distributed on the red axis of the histogram F(hist). Similarly, if the target object is blue, then histogram. F(hist) will reflect a majority of pixels along the blue axis. Thus, histogram F(hist) not only represents the image characteristics of the foreground area but may also represent the one or more physical characteristics of the target object, such as the object's color in this example.

Similarly, histogram B(hist) represents the image characteristics of the background area. Because the probability of the target object existing in the background area may be relatively low, histogram B(hist) may represent other non-target objects and features, such as background scenery. In the example of a moving vehicle, the background area may comprise features such as trees, roads, buildings, people, etc., that are not target objects being tracked. Accordingly, the distribution of pixels in B(hist) could be spread evenly across the 3D space (meaning there is an even distribution of colors in the background), or primarily in the gray color zone (e.g., representing the color of road pavement in the background area), or may comprise other possible distributions depending on what objects and features are in the background area.

After obtaining the histograms F(hist) and B(hist), at step 440 the system 100 may compare the image characteristics of these foreground and background histograms to identify the target object, such as the contours of the target object. In some embodiments, the system 100 may compare the image characteristics by calculating a new histogram. NF(hist) according to the formula below:

$$NF(hist) = \frac{F(hist)}{F(hist) + B(hist)} \quad (1)$$

The histogram NF(hist) in equation (1) above represents one possible comparison between the histograms F(hist) and B(hist), where each value in the histogram NF(hist) has a value between zero and one. In some embodiments, after the system 100 creates the histogram NF(hist), it may further normalize the values in NF(hist) to a range between zero to one if they were not already in this range. In other embodiments, the system 100 may scale or normalize the values in NF(hist) to fit within other desired value ranges. Alternatively, the system 100 may utilize other saliency detection formulas. In general, the function used for NF(hist) may be selected based on the type of histogram (e.g., 3D RGB space, HSV space, chrominance, luminance, brightness, lightness, darkness, etc.) and the physical characteristics used to track the target object in the perspective view.

Several assumptions may be made about NF(hist) based on formula (1). For example, if the foreground area contains the target object but the background area does not, then NF(hist) may comprise a relatively large value, for example greater than 0.5, in the portion of the histogram corresponding to a physical characteristic of the target object. The opposite assumption applies if the background area contains the object but the foreground area does not, whereby NF(hist) Will consist of relatively small values, for example less than 0.5. Further, if the foreground area and the background area both contain the target object, then the values of NF(hist) may fall within the middle of the range, e.g., around 0.5. In a disclosed embodiment using a 3D RGB color space for F(hist) and B(hist), it is possible to determine the probability whether or not a particular (R, G, B) element in the histogram NF(hist) represents the target object or not, as discussed further below.

At step 450, the system 100 back-projects the histogram NF(hist) onto the area of interest (e.g., onto the area of interest bounded by the perimeter 5b in FIG. 5). In some embodiments, the back-projection process may comprise analyzing each pixel value in the area of interest and reassigning the pixel's image characteristics based on its corresponding value in the histogram NF(hist), resulting in a new image in which every pixel in the area of interest is scaled between zero and one, based on its corresponding value the histogram NF(hist). In some embodiments, the system 100 previously normalized the values in histogram NF(hist), so the pixel values of the new image are also in the normalized range. For example, as a result of the back-projection process in step 450, the new image may appear as a gray-scaled version of the original image, where the image characteristics of the target object have been intensified or otherwise enhanced. FIG. 8a illustrates the result of this back-projection process applied to the exemplary perspective view shown in FIG. 7.

Figure 7:
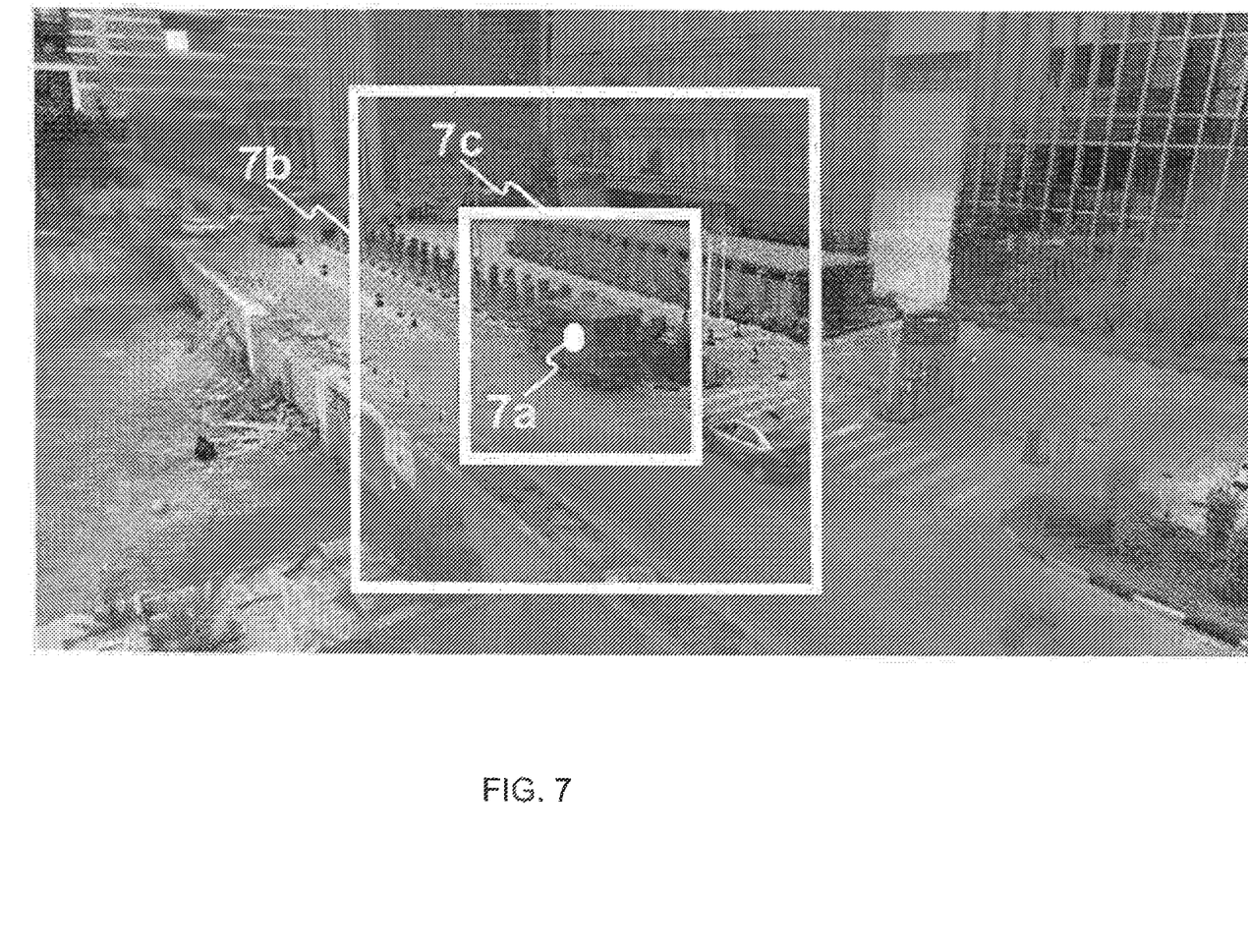
FIG. 7 is an exemplary perspective view that may be used to identify a target object in accordance with the disclosed embodiments.
Figure 8A:
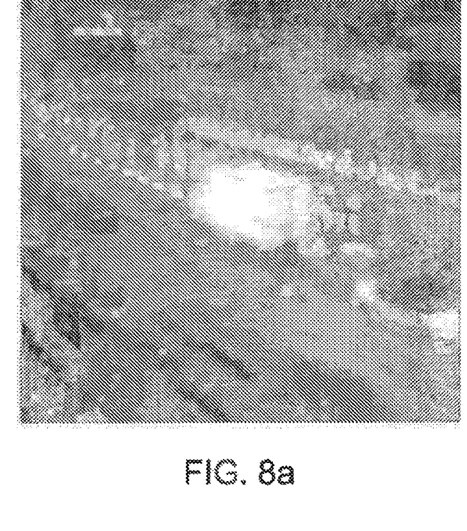
FIGS. 8a-d are exemplary views showing various stages of image processing for identifying a target object within the exemplary perspective view of FIG. 7 in accordance with the disclosed embodiments.

FIG. 7 illustrates an exemplary perspective view displayed on a display device, for example, showing an image captured by camera or video equipment on a UAV. In this example, the target object in the perspective view is a red truck that has been selected by a user who applied a point 7a on the truck using an appropriate input device. In this example, the system 100 identifies an area of interest 7b based on the user input and further determines a foreground area 7c in the perspective view. The system 100 may generate histograms F(hist), Whist), and NF(hist) as discussed above. FIG. 8a illustrates the area of interest 7b after each pixel value in the area of interest has been replaced with a corresponding value determined from the histogram NF(hist), for example, ranging in value from zero to one.

In some embodiments, the system 100 may further process the back-projected image to identify the contours of the target object. For example, the system 100 may use one or more filters to remove noise from the back-projected image created at step 450. Alternatively, or in addition, the system 100 may normalize the back-projected image to maximize its image intensity.

In an exemplary embodiment, the system 100 may optionally proceed to step 460 to further identify the target object such as the contours of the target object. Using formula (1) and the assumptions discussed above, the system may determine a threshold value where any pixels in the back-projected image having a histogram value greater than the threshold value likely contain information related to the target object. For example, in some embodiments, the system 100 may assume that F(hist) and Whist) have the same weight for purposes of determining a threshold value. In this example, the system may assume F(hist)=B(hist), so NF(hist)=0.5 based on formula (1), and therefore the system 100 may set the threshold value equal to 0.5. Alternatively, the system 100 may assign different weights to F(hist) and B(hist) to increase or decrease the threshold value. For example, if the system assumes F(hist)=4×B(hist), then NF(hist)=0.8, then the determined threshold value is equal to 0.8 in this different example.

If a pixel value in the histogram NF(hist) has a value greater than the threshold value, then the system 100 may assume the pixel most likely contains information related to the target object. Otherwise, for pixel values in histogram NF(hist) having a value less than or equal to the threshold value, the system 100 assumes such pixels most likely contain information related to the background area. Persons of ordinary skill in the art will appreciate that, for purposes of these examples, the weights and threshold values have been arbitrarily defined for the convenience of description.

In some embodiments, the system 100 may analyze the back-projected image (e.g., the back-projected image in FIG. 8a) using the threshold value. At step 460, for example, the system 100 may reassign pixels in the area of interest to define new foreground and background areas based on which pixel values in the back-projected image exceed the threshold value. In this embodiment, the new foreground area may be defined by analyzing the pixel values in the area of interest (in the back-projected image) on a pixel-by-pixel basis and comparing each of the pixel values with the threshold value. If the pixel value is greater than the threshold value, then that pixel is reassigned to the new foreground area. As a result, the new foreground area may no longer correspond to the original foreground area from step 420. Similarly, the new background area in this disclosed embodiment may he defined on a pixel-by-pixel basis and may not be coextensive with the originally defined background area from step 420. At step 460, the system 100 also may determine a new histogram NF(hist) based on the new F(hist) and B(hist) histograms, for example, using formula (1) above or another formula for combining the new F(hist) and B(hist) histograms.

In some embodiments where histogram. NF(hist) was previously normalized to a range between zero to one, the values stored in bins of the new histogram NF(hist) also may be in the range of zero to one. Alternatively, the bins of the new histogram NF(hist) may comprise other ranges based on the image characteristics of the back-projected image. Regardless of the actual range of values, the system 100 may assign any pixels in the back-projected image (which was generated at step 450) having pixel values greater than the threshold value to the new histogram F(hist). Otherwise, the system 100 may assign any pixels in the hack-projected image having pixel values equal to or less than the threshold value to the new histogram B(hist). In this process, the system 100 is not bound by the previously defined foreground and background areas.

Furthermore, by analyzing the back-projected image in this way, the system 100 may minimize any errors introduced earlier in the process. For example, if the original foreground area was too small, then the original foreground area did not capture the entire target object. Alternatively, if the original foreground area was too large, then the original foreground area captured too much of the background features. By assigning pixels in the back-projected image to new foreground and background areas based on their probability of containing information related to the target object, the system 100 may increase the chances of identifying the target object.

Having determined the new histogram. F(hist) and new histogram B(hist), the system 100 may analyze the age characteristics or physical meanings of the first back-projected image (e.g., FIG. 8a) to identify the contours of the target object. In some embodiments, the system 100 may use formula (1) again to determine the new histogram NF(hist). In other embodiments, the system 100 may normalize the new histogram NF(hist). As discussed above, other suitable formulas may also or alternatively be used in embodiments consistent with this disclosure, and the new histogram NF(hist) need not be generated using the same formula that was used to generate the original histogram NF(hist).

Figure 8B:
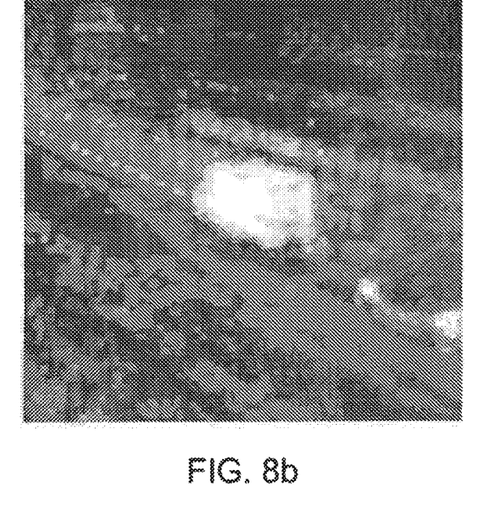

At step 470, the system 100 may back-project the new histogram NF(hist) onto the first back-projected image (e.g., FIG. 8a) to obtain a second hack-projected image (e.g., FIG. 8b). Alternatively, the system 100 may back-project the new histogram NF(hist) onto the original area of interest (e.g., the area bounded by the perimeter 7b in FIG. 7). Further, in some embodiments, the system 100 may use one or more filters to remove noise, or alternatively the system 100 may normalize the second back-projected image to maximize its image intensity. In yet other disclosed embodiments, the system 100 may repeat steps 460 and 470 through one or more additional iterations until the contours of the target object become more clearly identifiable in each generated back-projected image.

Figure 8C:
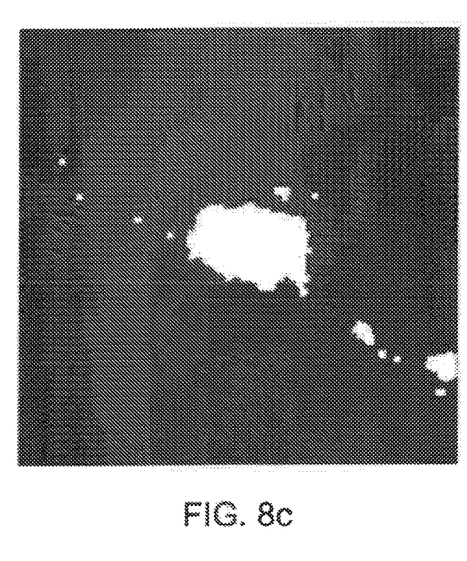

At step 480, after the creation of an acceptable back-projected image, e.g. the n-th back-projected image where n is any number greater than or equal to one, the system 100 may create a binary representation of the acceptable back-projected image. In some embodiments, the system 100 may use a predetermined cutoff value to produce the binary image, such, that every pixel value greater than the cutoff value may be assigned a maximum-value and every pixel value less than or equal to the cutoff value may be assigned a minimum value. For example, FIG. 8c illustrates a binary—representation of the exemplary back-projected image of FIG. 8b, where pixel values above a cutoff value were assigned a white color and pixel values less than or equal to the threshold value were assigned a black color. Alternatively, the system 100 may apply a low-pass filter to the n-th back-projected image to determine the closest valley to the maximum value in the histogram, such that the position of such a valley in the filtered image signal may be used to determine the cutoff value for generating the binary representation at step 480. In other embodiments, the system 100 instead may determine an intensity histogram representing the pixels of the n-th back-projected image in a range of grayscale.

The system 100 may extract the target object at step 490. In some embodiments, the system 100 performs a connected-component analysis on the binary image created at step 480. For example, the system 100 may assign certain identifiers to pixels in the binary image created at step 480. Any pixel that is connected to another pixel (e.g., sharing a border and having the same binary value) may be assigned the same identifier. Using this process, the system 100 may assign every connected component (e.g., region of adjacent pixels having the same binary value) with a unique identifier. Other suitable methods of performing connected-component analysis may also or alternatively be used in embodiments consistent with this disclosure.

Once the system 100 has identified the connected components by assigning unique identifiers to different pixel regions, it may identify the target object. For example, the system 100 may identify which connected component contains the user-selected point (or is included in the user-selected area) from step 410. The system 100 then may identify the target object as the object in the original perspective view that is at or near the same position of the area of interest as the identified connected component. In some embodiments, the actual contour of the target object relative to the contour of the connected component may be used to identify the target object. In other embodiments, the system 100 may define a new tracking perimeter around the target object, such as the exemplary tracking perimeter around the red truck (target object) in FIG. 8d, based on which the system 100 can perform various tracking tasks.

Further to the disclosed embodiments above, the exemplary process 400 allows the system 100 to accurately identify a target object based on a user selection. Moreover, the process 400 allows the system 100 to minimize the inclusion of background information during the target-tracking process. As a result, the process 400 provides a more robust and accurate method of identifying and tracking target objects.

FIGS. 5 and 6 illustrate exemplary foreground and background areas that may be used for identifying a target object in accordance with the disclosed embodiments. In some embodiments, a user may use a controller 104 to select a target object on a display device. In some embodiments, the user may use an input device, such as a stylus, mouse, trackpad, etc., to input the user's selection to the user controller 104. Alternatively, the user may use a finger to touch a capacitive touchscreen to enter the user's selection. In the exemplary embodiment shown in FIG. 5, the user selection represents the point 5a on the target object, which is shown as a car for simplicity. The point 5a may be a single pixel or may be any other pixel width or shape depending on the input device.

In some embodiments, the user input is communicated to a UAV 102 to be processed by hardware and/or software in the UAV. For example, the UAV 102 may receive the user input and may use the user selection to process images (including video frames) captured from the imaging device 106 to identify a user-selected target object in those images, consistent with the disclosed embodiments. Alternatively, the user input may be processed by hardware and/or software, such as an application, executing on the user controller 104, or alternatively processed by hardware and/or software running on a mobile device (such as a smartphone, tablet, laptop, etc.) connected to the user controller 104, to identity the target object consistent with the disclosed embodiments described herein.

According to an exemplary embodiment, the system 100 may define a perimeter 5b around an area of interest based on the user-selected point 5a. For example, the perimeter 5b of an area of interest may be created so the point 5a is at or near the center of the area. Alternatively, the perimeter 5b of an area of interest may be determined so the point 5a merely has to be located anywhere within the area. Using area within perimeter 5b as the potential area of interest, the system 100 may determine another perimeter 5c to define a target area intended to include the target object. In some embodiments, the perimeters 5b and 5c defining areas are concentric. In other embodiments, the perimeter 5c is chosen to be at or ear the center of the area 5b. In other embodiments, the system 100 may select the perimeter 5c at an arbitrary location within the perimeter 5b.

According to other exemplary embodiments, the user may use the user controller 104 to select an area around a target object on a display device. For example, the user may drag a cursor on the display device to select (as shown by dashed arrow 6a in FIG. 6) an area around a target object. In a exemplary embodiment, the system 100 may define the area of interest based on the user-selected area, where the perimeter 5b of the area of interest is the same as the boundary of the user-selected area. After defining the area of interest, the system 100 may create a perimeter 5c to define a foreground area as the target area. The perimeter 6c defining the target area may be at an arbitrary location within perimeter 5b of the area of interest.

As noted, FIGS. 7 and 8 show exemplary results of performing the exemplary technique for identifying a target object in accordance with the disclosed embodiments. FIG. 7 shows an image, for example obtained from a UAV, comprising a target object (e.g., the red truck) d various other background objects (e.g., the gray and red taxi, green landscaping, blue sign, buildings, structures, etc.). FIG. 7 also shows an example of the user-selected point 7a on the target object, and perimeters 7b and 7c. As shown in FIG. 7, the foreground area (e.g., the area inside perimeter 7c) contains the target object and various background objects. On the other hand, the background area (e.g., the area between perimeter 7b and 7c) contains only background objects, which includes a car that has a similar red color as the red truck which is the target object. Perimeters 7b and 7c in FIG. 7 were defined consistent with the disclosed embodiments.

Figure 8D:
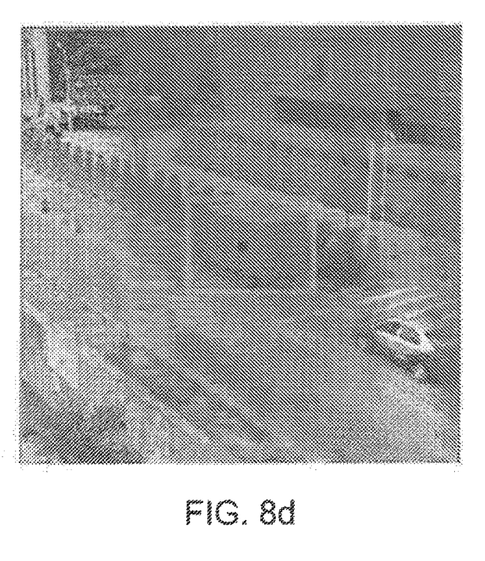

FIG. 8a shows the resulting image that is created by applying steps 430 to 450 in FIG. 4 to the exemplary perspective view shown in FIG. 7. FIG. 8b shows the image that is generated by applying steps 460 to 470 to the back-projected image in FIG. 8a. FIG. 8c shows a binary image that may result by applying step 480 to the n-th hack-projected image shown in FIG. 8b. FIG. 8d shows the final selection of the target object by the system 100 in this sequence of examples.

Other embodiments will be apparent to those skilled in the art from consideration of the specification and practice of the disclosed embodiments. It is intended that the specification and examples be considered as exemplary only, with a true scope and spirit of the disclosed embodiments being indicated by the following claims. It is to be understood that the examples and descriptions in this disclosure have been arbitrarily defined herein for the convenience of the description. The disclosed systems and methods are not limited to these simplified examples, and other features and characteristics may be considered so long as the specified functions are appropriately performed.

While certain disclosed embodiments have been discussed with respect to UAVs for purposes of discussion, one skilled in the art will appreciate the useful applications of disclosed methods and systems for identifying target objects. Furthermore, although aspects of the disclosed embodiments are described as being associated with data stored in memory and other tangible computer-readable storage mediums, one skilled in the art will appreciate that these aspects can be stored on and executed from many types of tangible computer-readable media. Further, certain processes and steps of the disclosed embodiments are described in a particular order, one skilled in the art will appreciate that practice of the disclosed embodiments are not so limited and could be accomplished in many ways. Accordingly, the disclosed embodiments are not limited to the above-described examples, hut instead are defined by the appended claims in light of their full scope of equivalents.

What is claimed is:

1. A method of identifying a target object in an image, the method comprising:
   receiving a user identification of a position of the target object in the image;
   defining a first area surrounding the user identified position based on the user identification and a second area surrounding the first area, wherein the first and second areas are concentric; and
   comparing image characteristics of the first area and the second area to identify the target object in the image.

2. The method of claim 1, wherein the step of comparing image characteristics further comprises:
   generating a first histogram representing the image characteristics in the first area and a second histogram representing the image characteristics in the second area;
   determining a third histogram by combining the first and second histograms using a predetermined function; and
   applying the third histogram to an area of interest, the area of interest comprising the first and second areas.

3. The method of claim 2, further comprising the steps of:
   redefining the first and second areas based on probabilities that a plurality of points in the area of interest contain the target object;
   generating a new first histogram representing the image characteristics in the redefined first area and a new second histogram representing the image characteristics in the redefined second area; and
   determining a new third histogram by combining the new first and second histograms using a second predetermined function.

4. The method of claim 3, further comprising the step of applying the new third histogram to the area of interest to create a back-projected image.

5. The method of claim 4, further comprising repeating each of the steps of redefining the first and second areas, generating a new first histogram and new second histogram, determining a new third histogram, and applying the new third histogram to the area of interest.

6. A movable object configured to identify a target object in an image, the movable object comprising:
   a memory storing executable instructions;
   an imaging device configured to acquire the image;
   a communication interface configured to receive a user identification of a position of the target object in the image;
   at least one processor configured to execute the stored instructions to:
      define a first area surrounding the user identified position based on the user identification and a second area surrounding the first area, wherein the first and second areas are concentric; and
      compare image characteristics of the first area and the second area to identify the target object in the image.

7. The movable object of claim 6, wherein the image characteristics include at least one of color, intensity, chrominance, luminance, brightness, lightness, and darkness.

8. The movable object of claim 6, wherein the user identified position is a user-selected point in the image.

9. The movable object of claim 6, wherein the user identified position is a user-selected area in the image.

10. The movable object of claim 6, wherein the at least one processor is further configured to execute stored instructions to perform the steps of:
    generating a first histogram representing the image characteristics in the first area and a second histogram representing the image characteristics in the second area;
    determining a third histogram by combining the first and second histograms using a predetermined function; and
    applying the third histogram to an area of interest, the area of interest comprising the first and second areas.

11. The movable object of claim 10, wherein the predetermined function determines, for each image characteristic, a ratio of a value for that image characteristic in the first area divided by a value for that image characteristic in both the first and second areas.

12. The movable object of claim 10, wherein the at least one processor is further configured to execute stored instructions to perform the steps of:
    redefining the first and second areas based on probabilities that a plurality of points in the area of interest contain the target object;
    generating a new first histogram representing the image characteristics in the redefined first area and a new second histogram representing the image characteristics in the redefined second area; and
    determining a new third histogram by combining the new first and second histograms using a second predetermined function.

13. The movable object of claim 12, wherein the same predetermined function is used to determine the third histogram and the new third histogram.

14. The movable object of claim 12, wherein the at least one processor is further configured to execute stored instructions to perform the step of:
    applying the new third histogram to the area of interest to create a back-projected image.

15. The movable object of claim 14, wherein the at least one processor is further configured to execute the stored instructions to repeat each of the steps of redefining the first and second areas, generating a new first histogram and new second histogram, determining a new third histogram, and applying the new third histogram to the area of interest.

16. The movable object of claim 6, wherein the first area is a foreground area and the second area is a background area surrounding the foreground area.

17. The movable object of claim 6, wherein the movable object is an unmanned aerial vehicle.

18. The movable object of claim 6, wherein the user input is received from a remote user controller configured to communicate with the movable object.

19. The movable object of claim 6, wherein the image is a perspective view comprising at least one of image and video data captured by the imaging device.

20. The movable object of claim 6, wherein the at least one processor is further configured to execute the stored instructions to identify likely contours of the target object.

21. The movable object of claim 6, wherein the at least one processor is further configured to execute the stored instructions to use the identified target object to track the target object's position.

22. The movable object of claim 6, wherein comparing image characteristics comprises:
    determining a representation of a first physical meaning based on the image characteristics in the first area;
    determining a representation of a second physical meaning based on the image characteristics in the second area; and
    comparing the representations of the first and second physical meanings to identify the target object in the image.

* * * * *